US009534932B2

United States Patent
Granig

(10) Patent No.: US 9,534,932 B2
(45) Date of Patent: Jan. 3, 2017

(54) XMR ANGLE SENSOR ARRANGEMENT WITH SAFETY MECHANISM AND METHOD FOR MONITORING THE SAME

(71) Applicant: Infineon Technologies AG, Neubiberg (DE)

(72) Inventor: Wolfgang Granig, Seeboden (AT)

(73) Assignee: Infineon Technologies AG, Neubiberg (DE)

( * ) Notice: Subject to any disclaimer, the term of this patent is extended or adjusted under 35 U.S.C. 154(b) by 182 days.

(21) Appl. No.: 14/200,926

(22) Filed: Mar. 7, 2014

(65) Prior Publication Data

US 2015/0253157 A1 Sep. 10, 2015

(51) Int. Cl.
*G01R 33/02* (2006.01)
*G01D 5/16* (2006.01)
*G01D 5/14* (2006.01)

(52) U.S. Cl.
CPC .............. *G01D 5/16* (2013.01); *G01D 5/145* (2013.01)

(58) Field of Classification Search
CPC . G01R 33/00; G01R 33/0017; G01R 33/0023; G01R 33/0035; G01R 33/02; G01R 33/06; G01R 33/07; G01R 33/072; G01R 33/075; G01R 33/09; G01R 33/091; G01R 33/093; G01R 33/095; G01R 33/096; G01R 33/098; G01R 33/022; G01R 35/00; G01D 5/12; G01D 5/14; G01D 5/16; G01D 5/142; G01D 5/145; G01D 5/147; G01P 3/487; G01N 27/72; G01N 27/82; G01B 7/30

(Continued)

(56) References Cited

U.S. PATENT DOCUMENTS 5,650,721 A * 7/1997 van den Berg ........ B82Y 25/00
                                                      324/207.21
2010/0211347 A1* 8/2010 Friedrich ........... G01R 33/0023
                                                         702/117

(Continued)

OTHER PUBLICATIONS

Infineon Technologies AG. "TLE5009: Angle Sensor—GMR-Based Angular Sensor Data Sheet." Apr. 2012.

*Primary Examiner* — Arleen M Vazquez
*Assistant Examiner* — Steven Yeninas
(74) *Attorney, Agent, or Firm* — Eschweiler & Associates, LLC

(57) ABSTRACT

An XMR angle sensor arrangement with a safety mechanism comprises an XMR angle sensor having a sensing area for sensing an in-plane magnetic field and for outputting a sensor signal based on the in-plane magnetic field component sensed in the sensing area; a permanent magnet, which is rotatably arranged with respect to the XMR angle sensor to generate a first in-plane magnetic field component in the sensing area of the XMR angle sensor; an excitation current rail path, which is arranged proximate to the sensing area of the XMR angle sensor; and an excitation current provider configured to provide the excitation current rail path with an excitation signal having a excitation signal strength, wherein the excitation signal strength of the excitation signal is chosen to generate a second in-plane magnetic field component in the sensing area of the XMR angle sensor which results, due to a super position of the first and second in-plane magnetic field components, in an expected change of the direction of the resulting in-plane magnetic field component, wherein the XMR angle sensor arrangement is correctly functioning when the sensed change of direction of the resulting in-plane magnetic field component due to the excitation signal corresponds to the expected change of direction of the resulting in-plane magnetic field component.

22 Claims, 11 Drawing Sheets

(58) Field of Classification Search
USPC ............. 324/202, 207.11, 207.12, 207.21,
207.25,324/207.26, 225, 228, 239, 240,
252, 259,324/207.2, 207.13, 207.14,
207.22, 232, 234; 310/68 B; 702/142,
145, 150, 151
See application file for complete search history.

(56) References Cited

U.S. PATENT DOCUMENTS

2012/0153947 A1   6/2012  Ausserlechner
2013/0265037 A1*  10/2013 Friedrich ............... G01R 33/07
                                                324/207.2

* cited by examiner

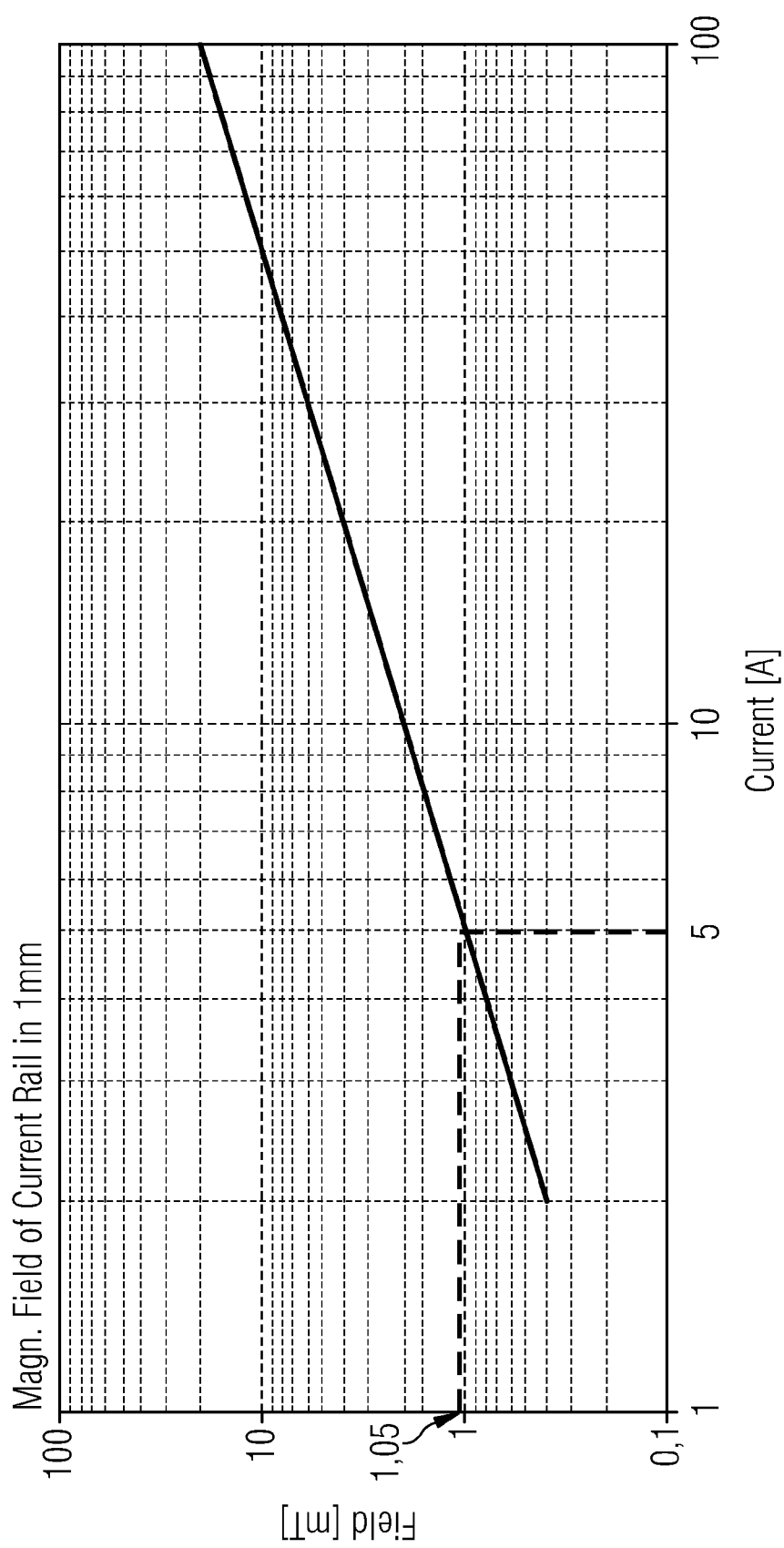

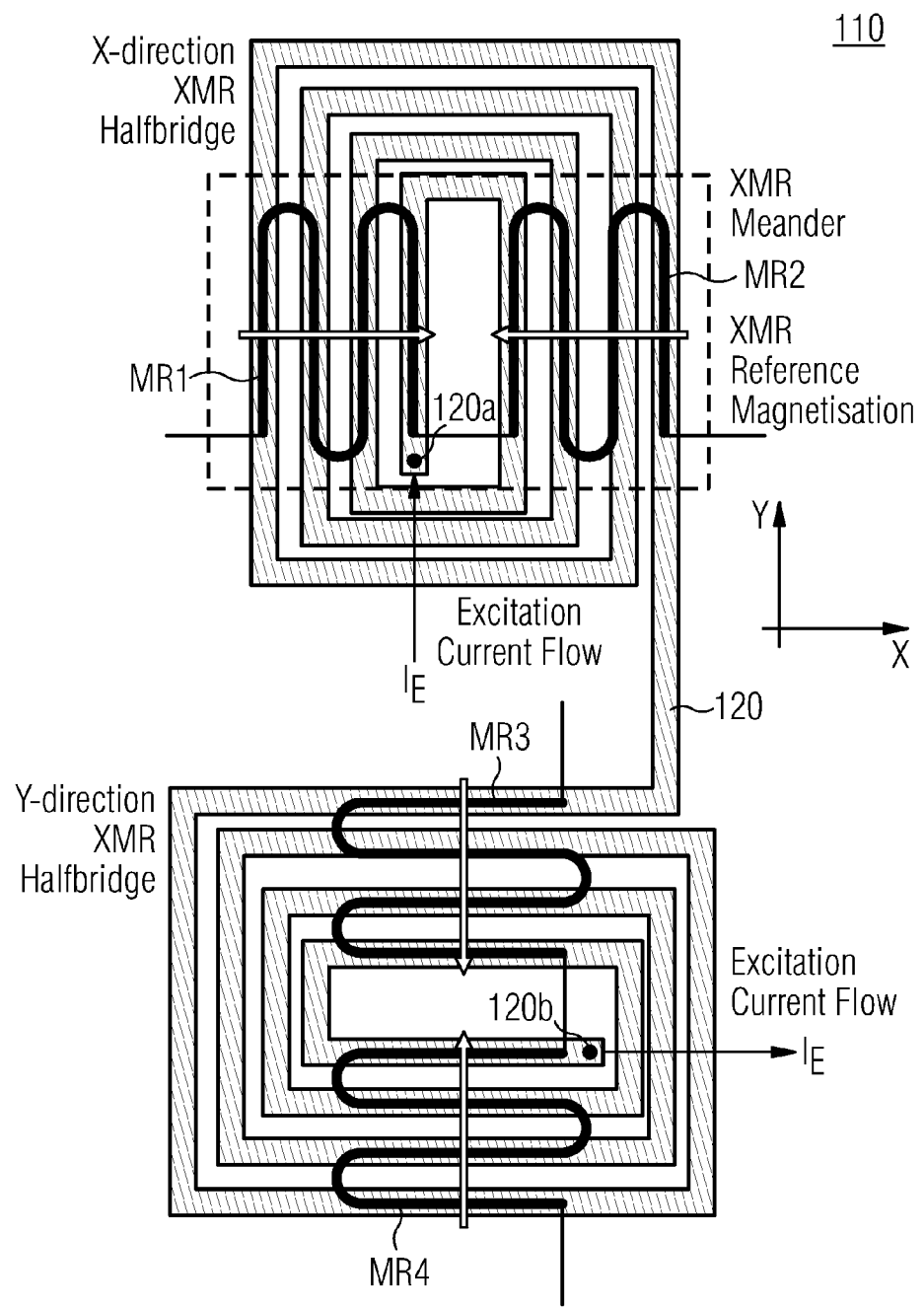

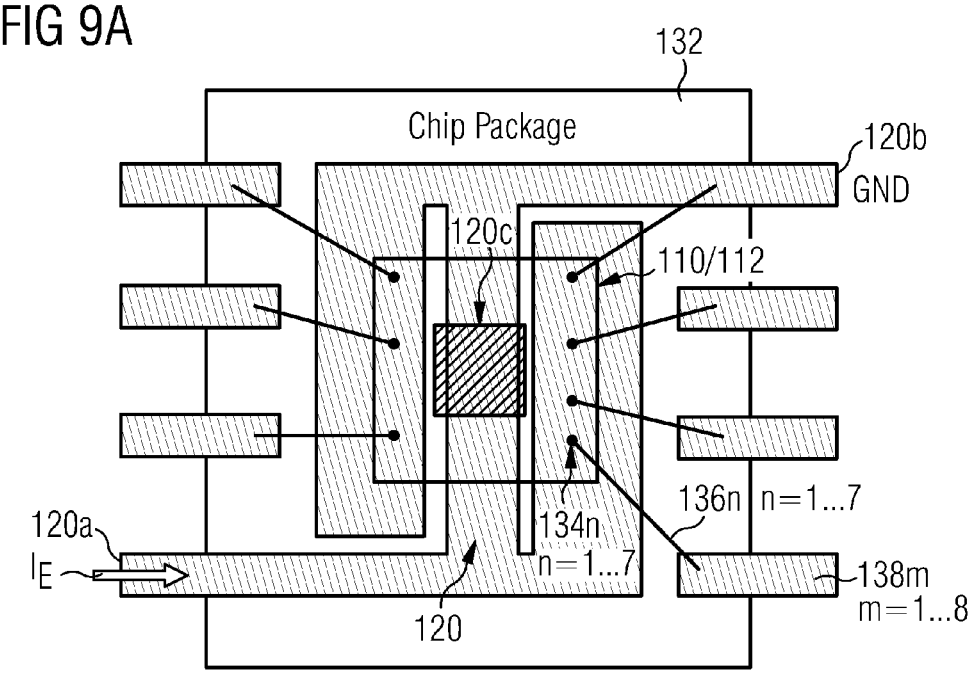
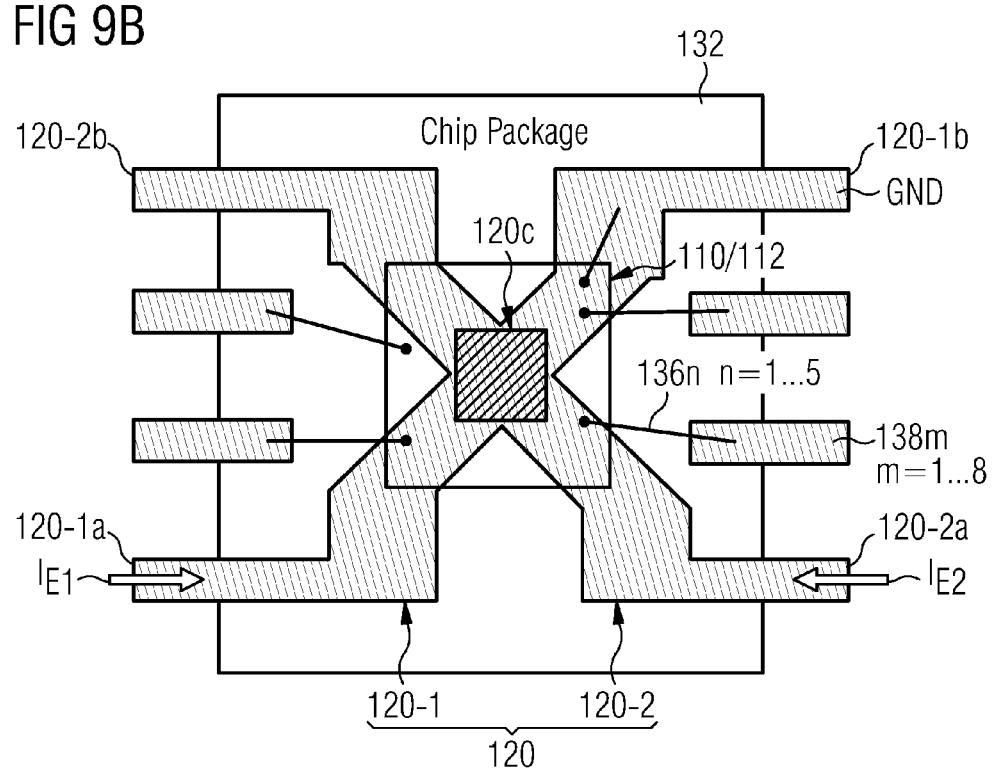

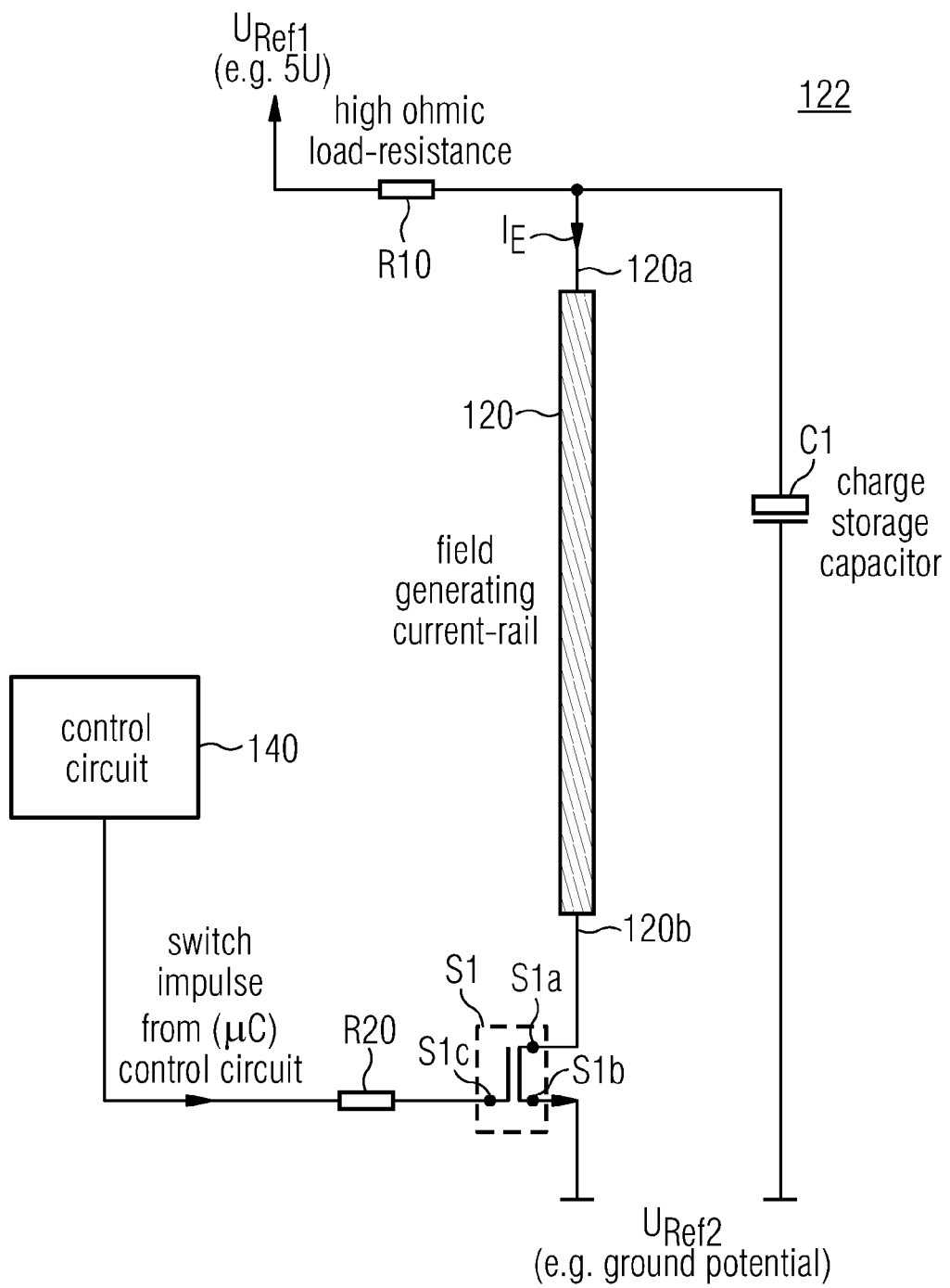

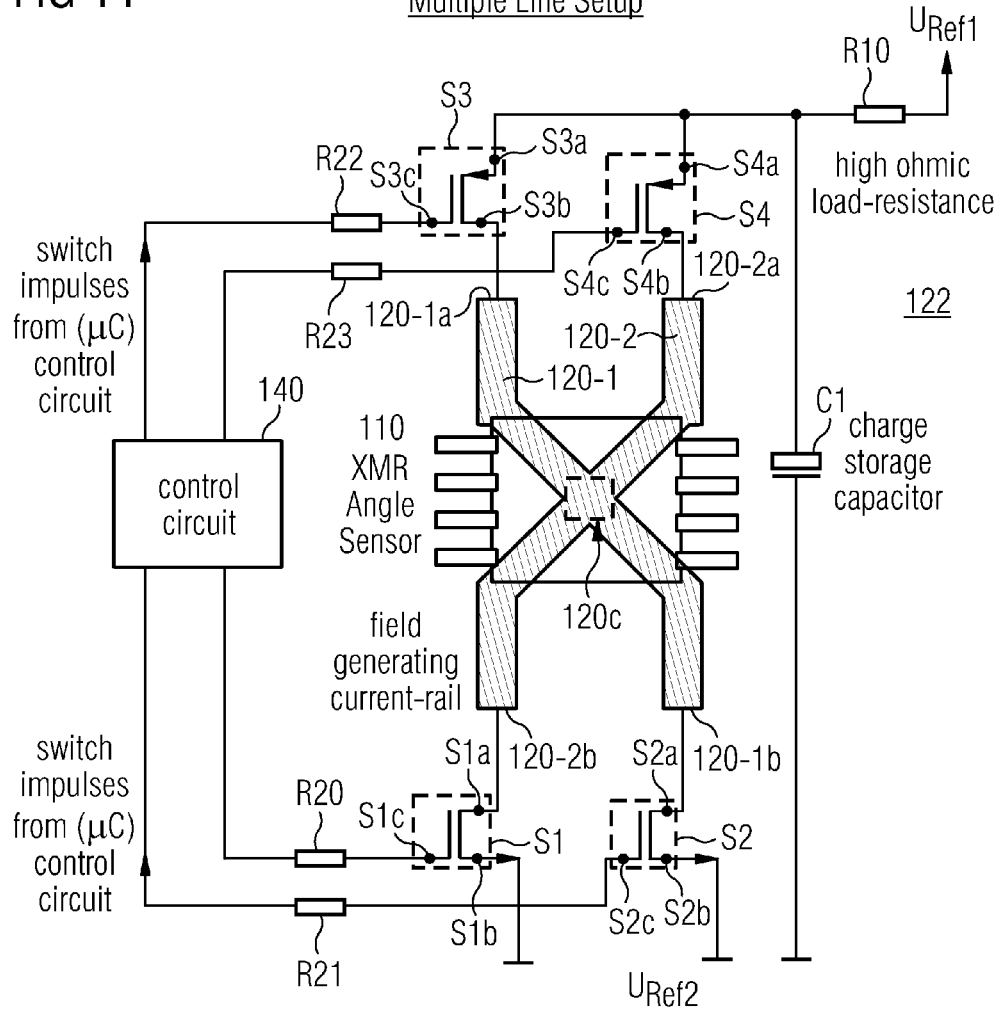

FIG 13

300 generating a first in-plane magnetic field component with a permanent magnet in the sensing area of the XMR angle sensor

302 generating a second in-plane magnetic field component in the sensing area of the XMR angle sensor by providing an excitation current rail path with an excitation signal having a excitation signal strength,
wherein the excitation signal strength of the excitation signal is chosen to generate a second in-plane magnetic field component in the sensing area of the XMR angle sensor which results, due to a super position of the first and second in-plane magnetic field components, in an expected change of the direction of the resulting in-plane magnetic field component

304 sensing with an XMR angle sensor an in-plane magnetic field component and for outputting a sensor signal based on the in-plane magnetic field component sensed in the sensing area

306 evaluating the functioning oft the XMR angle sensor arrangement by determining whether the sensed change of direction of the resulting in-plane magnetic field component due to the excitation signal corresponds to the expected change of direction of the resulting in-plane magnetic field component

308

XMR ANGLE SENSOR ARRANGEMENT WITH SAFETY MECHANISM AND METHOD FOR MONITORING THE SAME

FIELD

The invention relates to an XMR angle sensor arrangement and a method for monitoring the same. In particular, the present invention relates to an improved XMR angle sensor safety mechanism.

BACKGROUND

In general, a magnetic angle sensor arrangement consists of a small permanent magnet on a rotating shaft. Magnetic field sensors detect the magnetic field of the rotating magnet and conclude back on the rotational position of the shaft.

Magnetic angle sensors are often used in safety-critical applications like steering angle measurements, brake-boost applications, clutch applications, etc., to detect the position of a rotating element. Sometimes, magnetic angle sensors are also mounted on a motor-shaft to detect the shaft-angle for motor-current-commutation.

Safety critical applications need safety-mechanisms to detect the correctness and safety reliability of the measurement signal. A common approach is to use two sensor chips in parallel, to provide a sensor redundancy. However, sensor redundancy does not identify systematic problems in the sensor product. Thus, sensor diversity may form an improved approach, using two separate sensor products, or even two separate sensor principles.

A commonly known problem for a steering angle measurement system is the reliability of the initial angle value. The correctness of this value cannot be checked during startup. Known safety mechanisms which are currently available and in use, use a "dual sensor" concept for providing sensor redundancy, or use a so called "dual die" concept for providing sensor diversity.

For a dual sensor concept, any kind of a dual-sensor principle using two separate sensor products are in use. To fulfill diversity, two different sensor principles or two different suppliers are used (e.g. AMR, GMR, TMR). A dual die approach is, for example, to reduce PCB area (PCB=Printed Circuit Board), wherein two different sensors are placed into one single chip-package. Here, two different sensor principles are also used in order to fulfill sensor diversity (see e.g. TLE5009, TLE5109).

SUMMARY

Embodiments of the present invention provide an XMR angle sensor arrangement with a safety mechanism comprising an XMR angle sensor having a sensing area for sensing an in-plane magnetic field and for outputting a sensor signal based on the in-plane magnetic field component sensed in the sensing area; a permanent magnet, which is rotatably arranged with respect to the XMR angle sensor to generate a first in-plane magnetic field component in the sensing area of the XMR angle sensor; an excitation current rail path, which is arranged proximate to the sensing area of the XMR angle sensor; and an excitation current provider configured to provide the excitation current rail path with an excitation signal having an excitation signal strength, wherein the excitation signal strength of the excitation signal is chosen to generate a second in-plane magnetic field component in the sensing area of the XMR angle sensor which results, due to a super-position of the first and second in-plane magnetic field components, in an expected change of the direction of the resulting in-plane magnetic field component, wherein the XMR angle sensor arrangement is correctly functioning when the sensed change of direction of the resulting in-plane magnetic field component due to the excitation signal corresponds to the expected change of direction of the resulting in-plane magnetic field component.

Further embodiments of the present invention provide a method for monitoring the functionality of an XMR angle sensor arrangement, the method comprising generating a first in-plane magnetic field component with a permanent magnet in the sensing area of the XMR angle sensor; generating a second in-plane magnetic field component in the sensing area of the XMR angle sensor by providing an excitation current rail path with an excitation signal having an excitation signal strength, wherein the excitation signal strength of the excitation signal is chosen to generate a second in-plane magnetic field component in the sensing area of the XMR angle sensor which results, due to a super-position of the first and second in-plane magnetic field components, in an expected change of the direction of the resulting in-plane magnetic field component; sensing with an XMR angle sensor an in-plane magnetic field component and for outputting a sensor signal based on the in-plane magnetic field component sensed in the sensing area; and evaluating the functioning of the XMR angle sensor arrangement by determining whether the sensed change of direction of the resulting in-plane magnetic field component due to the excitation signal corresponds to the expected change of direction of the resulting in-plane magnetic field component.

The method may further comprise evaluating the functioning of the XMR angle sensor arrangement by comparing the sensed change of direction of the resulting in-plane magnetic field component due to the excitation signal with the expected change of direction of the resulting in-plane magnetic field component; and providing a comparison result having an indication of the correct functioning or of a malfunction of the XMR angle sensor arrangement.

The present invention is based on the finding that the proper functionality of an XMR angle sensor arrangement can be checked even during startup by using an additional excitation magnetic field component for achieving an expected (and under proper working conditions "predictable") change of the direction of the resulting in-plane or lateral magnetic field component in the sensing area. To be more specific, in addition to a first in-plane magnetic field component in a sensing area of an XMR angle sensor generated by a rotatable permanent magnet, a second in-plane magnetic field component is generated in the sensing area of the XMR angle sensor by means of an excitation signal supplied to an excitation current rail path proximate to the sensing area of the XMR angle sensor. Due to a superposition of the first and second in-plane magnetic field components, an expected and predictable change of the direction of the resulting in-plane magnetic field component results. Based on the sensed change of direction, a decision can be made whether the XMR angle sensor arrangement is correctly functioning or working if the condition is fulfilled that the sensed change of direction of the resulting in-plane magnetic field component (due to the excitation signal) corresponds to the expected change of direction of the resulting in-plane field component.

To be more specific, an excitation current rail path below or above the sensing area of the angle sensor element is used to change the direction of the magnetic field in the sensor area, i.e. to change the direction of the in-plane magnetic field component in the sensing area of the XMR angle sensor. As the excitation current pulse can provide a predictable change of direction of the resulting in-plane magnetic field component in the sensing area, this safety mechanism can be used to detect the correctness of the currently applied angle as well as the correctness of the magnetic field strength of the externally applied magnetic field which is referred to as "magnetic loss detection".

Thus, this safety mechanism for an XMR angle sensor arrangement can check the reliability and correctness of the initial angle value even during startup of the XMR angle sensor arrangement. In addition, it is possible to reliably detect a so-called "magnet loss detection". To be more specific, XMR angle sensors typically comprise a small permanent magnet that is attached to the shaft whose rotational position is to be measured. This magnet, however, can become unattached, chipped or broken, or can attract a loose piece of metal that shorts a portion of the magnetic field. These situations, which can provide angle measurement errors, can be detected by the safety mechanism.

This safety mechanism for an XMR angle sensor arrangement can identify a safety problem in the power-up phase, i.e. at power-up for the initial angle value. This safety mechanism could be implemented as a cost effective PCB related safety mechanism. The safety mechanism can be active during all operation or, alternatively, only during startup, wherein after startup this safety mechanism can be deactivated to save power-consumption of the XMR angle sensor arrangement.

BRIEF DESCRIPTION OF THE DRAWINGS

Embodiments of the present invention are described herein making reference to the appended drawings.

FIG. 4 shows a principle diagram of the resulting in-plane magnetic field component generated by the excitation current rail path in the sensing area of the XMR angle sensor arrangement according to an embodiment;

FIG. 8 shows a schematic plane view of an XMR angle sensor arrangement using a single "wire on chip" for two orthogonal sensor half-bridge circuits according to an embodiment;

FIGS. 9A-9B show a schematic plane view of an XMR angle sensor arrangement using a chip lead frame portion as an excitation current rail path according to an embodiment;

FIG. 10 shows a schematic circuit diagram of an exemplary implementation of the excitation current provider and the associated excitation current rail path of the XMR angle sensor arrangement according to an embodiment;

FIG. 11 shows a schematic circuit diagram of an exemplary implementation of the excitation current provider and the associated excitation current rail path of the XMR angle sensor arrangement according to an embodiment;

FIG. 13 shows a flow chart of a method of monitoring the functionality of an XMR angle sensor arrangement.

Figure 1A:
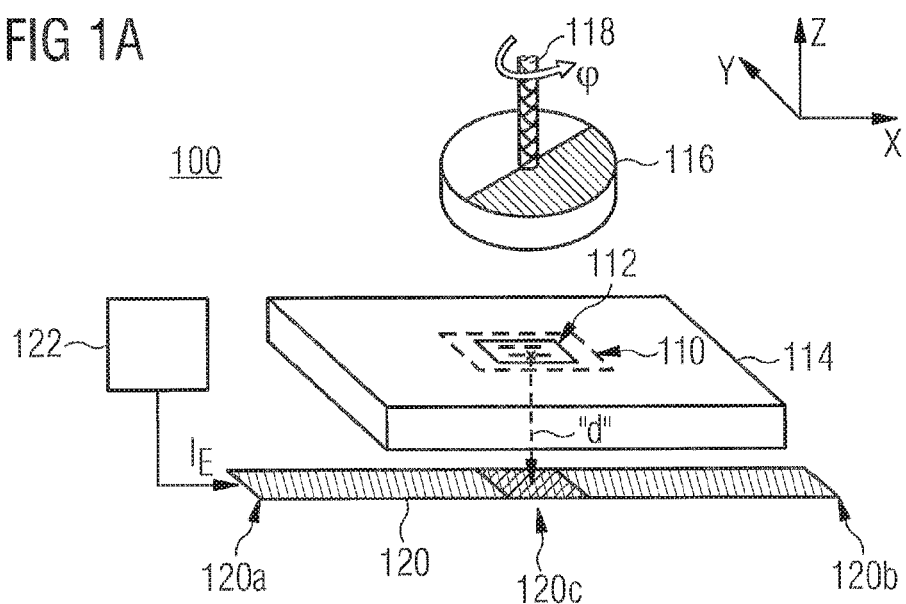
FIGS. 1A-1B show a schematic perspective view of an XMR angle sensor arrangement with safety mechanism according to an embodiment.

Equivalent or equal elements or elements with equal or equivalent functionality are denoted in the following description with equal or equivalent reference numerals. As the same or functionally equal elements are given the same reference numbers in the figures, a repeated description for elements provided with the same reference numbers is omitted. Hence, descriptions provided for elements having the same reference numbers are mutually exchangeable.

DETAILED DESCRIPTION

In the following, a plurality of details are set forth to provide a more thorough explanation of the embodiments of the present invention. However, it will be apparent to those skilled in the art that embodiments of the present invention may be practiced without these specific details. In other instances, well-known structures and devices are shown in block diagram form or in a schematic view rather than in detail in order to avoid obscuring embodiments of the present invention. In addition, features of the different embodiments described hereinafter may be combined with each other, unless specifically noted otherwise.

FIG. 1a shows a perspective view of an XMR angle sensor arrangement 100 (with safety mechanism). The XMR angle sensor arrangement 100 of FIG. 1a comprises an XMR angle sensor 110 for sensing an in-plane magnetic field component in a sensing area 112 and for outputting a sensor signal based on the in-plane magnetic field component sensed in the sensing area 112. The XMR angle sensor 110 may be arranged on a substrate 114, e.g. on a silicon die. The XMR angle sensor arrangement 100 further comprises a permanent magnet 116 which is, for example, mounted on a shaft 118, wherein the XMR angle sensor 110 in the sensor area 112 is arranged, for example, axially with respect to the shaft 118. The permanent magnet 116 is rotatably and axially arranged with respect to the XMR angle sensor 110 to generate a (first) in-plane magnetic field component in the sensing area 112 in the XMR angle sensor 110.

Magnetoresistive angle sensors typically are thin, flat structures formed on a main surface of a substrate, such as a semiconductor die. The projection of the magnetic field generated by the permanent magnet 116 onto this sensor area 112 is referred to as the in-plane magnetic field component. XMR sensor elements directly measure the angle between the in-plane magnetic field component and a reference direction (also called a reference magnetization) in the sensor area 112.

According to embodiments of the present invention, the XMR angle sensor 110 for detecting a magnetic field comprises magnetoresistive sensor elements or structures, which are in the following generally referred to as XMR sensor elements magnetoresistive sensor elements. In the following description, the term "XMR sensor element" is to include all known magnetoresistive structures such as AMR (anisotropic magneto resistance) structures, GMR (giant magneto resistance) structures, CMR (colossal magneto resistance) structures, TMR (tunnel magneto resistance) structures or EMR (extraordinary magneto resistance) structures. In technical applications of GMR and TMR sensor assemblies so-called spin-valve structures are often used, for example.

The XMR angle sensor arrangement further comprises an excitation current rail path 120, which is arranged proximate, i.e. in a vertical distance "d", from the XMR angle sensor 110 in the sensor area 112. An excitation current provider 122, e.g. a control circuit, is configured to provide the excitation current rail path 120 with an excitation signal $I_E$ (or excitation current pulse) having a predefined signal/current strength $I_E$ and signal length $T_E$ (excitation period). The signal strength (and also the length) of the excitation current pulse is chosen (e.g. set by the excitation current provider 122) to generate a second in-plane magnetic field component in the sensing area 112 of the XMR angle sensor 110. Considering the boundary conditions, e.g. the parameters like dimensions, magnetic field strength, the alignment of the elements etc., of the XMR angle sensor arrangement in a correct working condition, then the superposition of the first and second in-plane magnetic field components results (during proper operational conditions) in a predictable and expected (predefined) change of the direction of the resulting in-plane magnetic field component during the presence of the excitation signal.

Thus, it can be determined and monitored whether the XMR angle sensor arrangement 100 is correctly working and functioning. If the sensed change of direction of the resulting in-plane magnetic field component (during the excitation current pulse) corresponds (is within in a tolerance range equal) to the expected change of direction of the resulting in-plane magnetic field component, then it can be assumed that the XMR angle sensor arrangement 100 is correctly working and functioning.

To summarize, the correct functioning of the XMR angle sensor arrangement 100 is derivable from the sensor output signal of the XMR angle sensor during the supply of the excitation signal, which means that the XMR angle sensor arrangement 100 functions correctly if the sensor signal correctly indicates the expected (and under proper working conditions "predictable") change of direction of the resulting in-plane magnetic field component.

Figure 2:
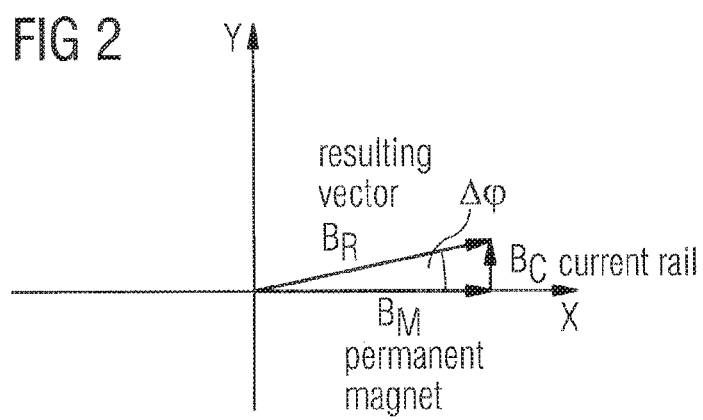
FIG. 2 shows a diagram of the superposition of the resulting in-plane (lateral) magnetic field components in the x-y-plane of the sensing area of the XMR angle sensor according to an embodiment.

In this connection, it is exemplarily pointed to the illustration in FIG. 2 showing a schematic view of the superposition of the resulting in-plane magnetic field components. To be more specific, FIG. 2 shows the superposition of the magnetic field $B_M$ of the rotating permanent magnet 116 and the magnetic field component $B_C$ generated by the excitation signal $I_E$ on the excitation current rail path 120.

As shown in FIG. 1a, the excitation current rail path 120 is arranged in a vertical distance d from the sensor area 112. Moreover, it is shown in FIG. 1a that the excitation current rail path 120 is arranged below the sensing area 112. However, the excitation current rail path 120 may be also arranged above the sensor area 112, i.e. between the sensor area 112 and the magnet 116. In use, the XMR angle sensor arrangement 100 powers on and begins to measure the angle "φ1" of the applied magnetic field $B_M$ of the permanent magnet 116 without passing an excitation signal $I_E$ through the excitation current rail path 120. Then, the excitation signal $I_E$ is applied to the excitation current rail path 120 resulting in a superimposing in-plane magnetic field $B_C$ which is perpendicular to the magnetic field $B_M$ of the permanent magnet 116. Then, a second angle "φ2", i.e. a change of direction of the resulting in-plane magnetic field component is measured which is different from the angle φ1 because of the addition of the second in-plane magnetic field component, with $$\Delta\phi=|\phi1-\phi2|;\text{ and }B_C=\tan(\phi1-\phi2)B_M=\tan(\Delta\phi)B_M.$$

Based on the above equation, the necessary signal strengths of the excitation signal can be calculated under consideration of the vertical distance d between the excitation current rail path 120 and the sensor area 112.

As shown in FIG. 1a, the excitation current provider 122 feeds the excitation signal $I_E$ to the excitation current rail path 120.

The XMR angle sensor arrangement 100 may further comprise a processing unit (not shown in FIG. 1a) which is configured to evaluate the correct functioning of the XMR angle sensor arrangement based on the output signal of the XMR angle sensor. To be more specific, the processing unit can be configured to compare the sensed change of direction of the resulting (superimposed) in-plane magnetic field component during the excitation current pulse with the expected/predicted change of direction of the resulting in-plane magnetic field component, and to provide a comparison result having an indication of the correct functioning or of a malfunction of the XMR angle sensor arrangement 100.

In case the sensed change of direction of the resulting in-plane magnetic field component corresponds within a tolerance range to the expected change of direction of the resulting in-plane magnetic field component, the XMR angle sensor arrangement 100 is correctly working. Otherwise, if the sensed changed of direction of the resulting in-plane magnetic field component does not correspond to the expected (and under proper working conditions predicted) change of direction of the resulting in-plane magnetic field component, a malfunction of the XMR angle sensor arrangement 100 can be diagnosed and (externally) indicated.

The excitation current provider 122 may comprise a control circuit (not shown in FIG. 1a) which is configured to activate the supply of the excitation signal $I_E$ to the excitation current rail path 120. The control circuit of the excitation current provider 122 as well as the processing unit, which is configured to evaluate the correct functioning of the XMR angle sensor arrangement based on the output signal of the XMR angle sensor, may be both part of microprocessor (not shown in FIG. 1a).

The control circuit and/or the processing unit can be arranged on-chip with the XMR angle sensor 110, i.e. on the same substrate and in the same chip packaged device. Thus, a microprocessor comprising the control circuit and/or the processing unit can be arranged on-chip with the XMR angle sensor 110. Alternatively, the control circuit and/or the processing unit can be arranged on a separate chip with respect to the XMR angle sensor 110, i.e. on different substrates and in different chip packaged devices. Thus, a microprocessor comprising the control circuit and/or the processing unit can also be arranged on a separate chip with respect to the XMR angle sensor 110.

As shown in FIG. 1a, the excitation current rail path 120 extends between an input contact 120a and an output contact 120b of the rail path 120, wherein the excitation current rail path 120 runs through a rail path position 120c which is vertically offset to the sensing area 112 of the XMR angle sensor 110 by a distance d, e.g. of less than 1 mm. In order to minimize the necessary signal strength of the excitation signal $I_E$ for generating the second in-plane magnetic field component, the distance d should be as low as possible.

Figure 1B:
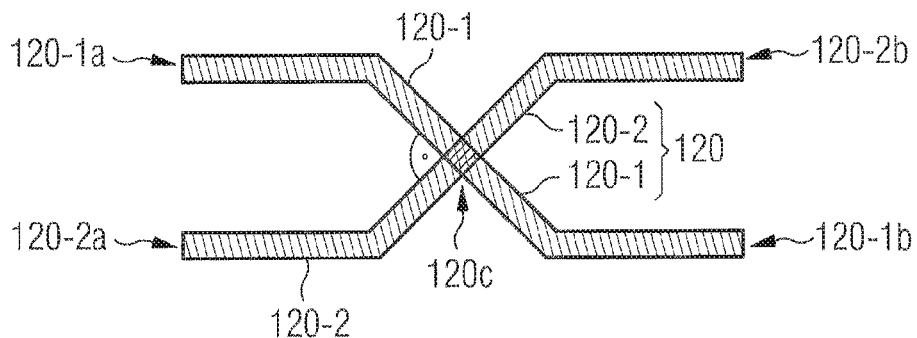

As shown in FIG. 1b, the excitation current rail path 120 may comprise a first rail path section 120-1 and a second rail path section 120-2, wherein the first path section 120-1 extends between a first input contact 120-1*a* and a first output contact 120-1*b*, and the second rail path section 120-2 extends between a second input contact 120-2*a* and a second output contact 120-2*b*, wherein the first and second rail path sections 120-1, 120-2 cross each other in the rail path position 100*c* in an orthogonal direction to each other. The first rail path section 120-1 and the second rail path section 120-2 the excitation current rail path 120 may extend in a common plane of the excitation current rail path 120, wherein the first and second rail path sections 120-1, 120-2 can be either electrically isolated or connected. If they are electrically isolated then the two orthogonal current-rails have a vertical distance to each other and therefore a different field-coupling to the XMR, but this can be compensated in the analysis algorithm using different gains.

To summarize, FIG. 1*b* shows a configuration for the excitation current rail path 120 for generating a two-dimensional excitation magnetic field wherein the first and second rail path sections 120-*a*, 120-2 cross each other in the rail path position 120*c* in an orthogonal direction to each other. This arrangement of the excitation current rail path allows to generate a changing rotational magnetic field independent of the actual position of the external permanent magnet 116.

Figure 3A:
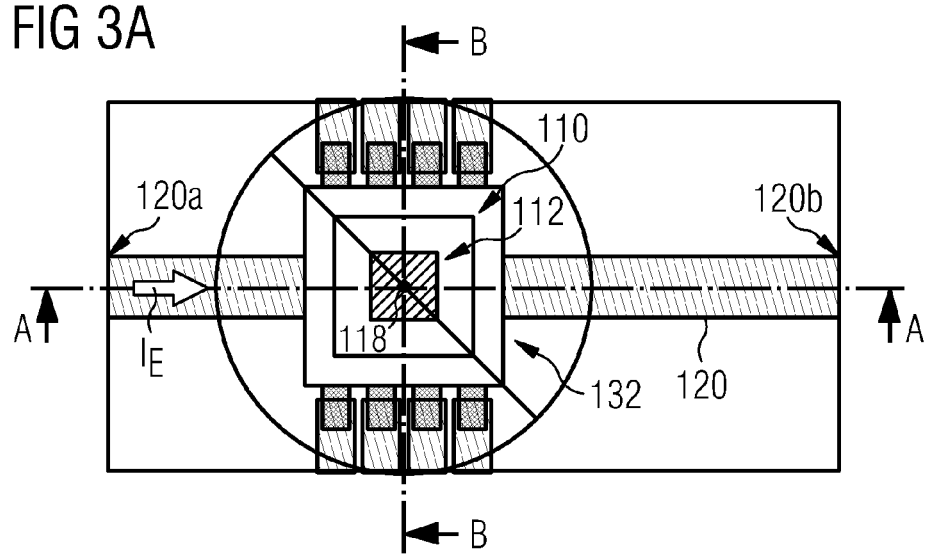
FIGS. 3A-3C show schematic (plane, side and elevation) views of an XMR angle sensor arrangement with an excitation current rail path configuration according to an embodiment.
Figure 3B:
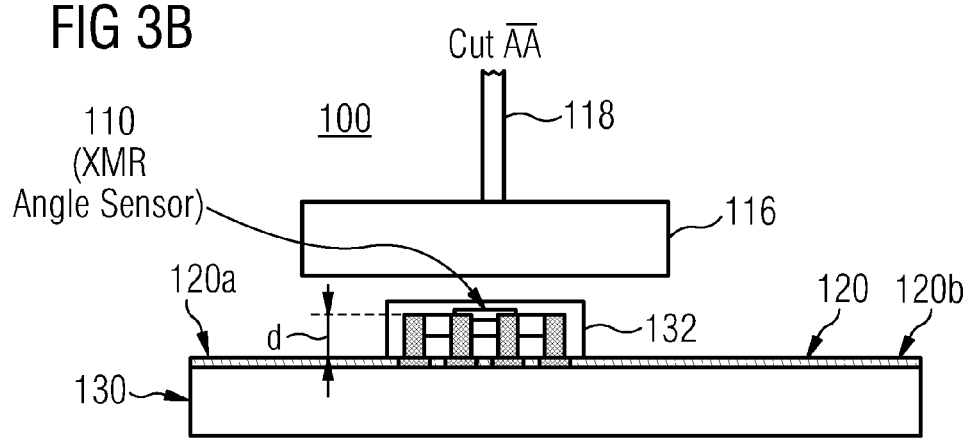
Figure 3C:
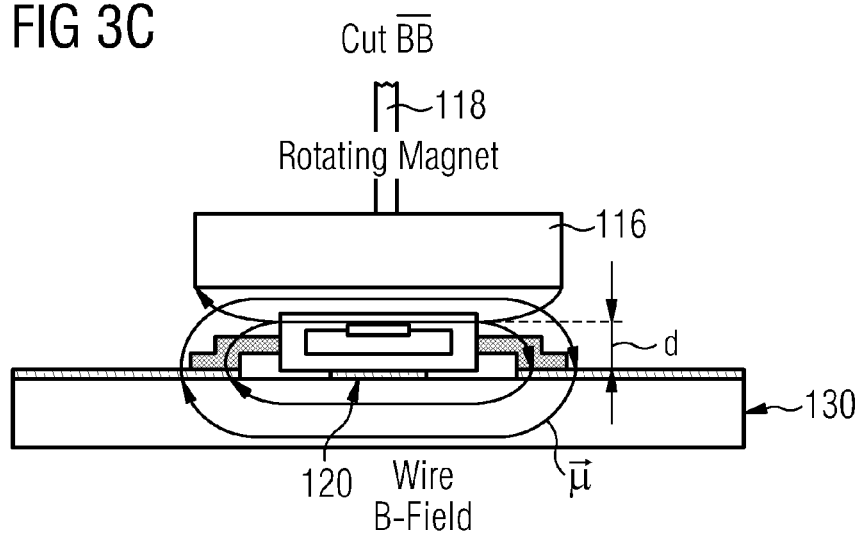

FIGS. 3*a*-*c* show different views of a magnetic angle sensor system 100 according to the further embodiment, wherein the XMR angle sensor 110 is a chip package device mounted on a PCB 130 (PCB=Printed Circuit Board) and wherein the excitation current rail path 120 comprises a conductor trace (wire) on the printed circuit board 130. The XMR angle sensor 110 may be a surface mounted device (SMD).

FIG. 3*a* shows a schematic plane view of the magnetic angle sensor system 100, which comprises the package XMR angle sensor 110, the permanent magnet 116 attached to the shaft 118. The XMR angle sensor 110 is packaged in the chip package device 132 which is mounted on the PCB 130.

FIG. 3*b* is a schematic elevation view of the magnetic angle sensor system 100 along the cut line "AA" of FIG. 3*a*, wherein FIG. 3*c* is s schematic elevation view of the magnetic angle sensor system 100 along the cut line "BB" of FIG. 3*a*.

In this connection it is pointed out to the fact that the above evaluations with respect to FIGS. 1*a*-*b* and 2 are equally applicable to the magnetic angle sensor system 100 of FIGS. 3*a*-*c*. In the following, FIGS. 2 and 4 are further referred to for calculating the generated magnetic field component in the sensor area 112 by means of the excitation signal $I_E$ provided to the excitation current rail path 120.

As shown in FIGS. 3*b*-*c*, the vertical distance "d" exists between the excitation current rail path 120 and the sensing area 112 of the XMR angle sensor 110. For the further discussion it is exemplarily assumed that the vertical distance d is 1 mm. It should become clear that the following evaluations are equally applicable to different vertical distances d, which may be based on the respective dimensions of the chip package device 132.

FIG. 2 shows a schematic view of the superposition of the resulting in-plane magnetic field components $B_R$ in the sensor area 112, i.e. the superposition of the in-plane magnetic field $B_M$ of the rotating permanent magnet 116 and the in-plane magnetic field component $B_C$ generated by the excitation signal $I_E$ on the excitation current rail path 120 excited. In case of a permanent magnet (providing a magnet field strength or magnetic flux density $B_M$) of 30 mT and a planned excitation of larger than the worst-case angle error $\Delta\phi$ (e.g. 2°), the following equation indicates the necessary strength of the excitation field (for this exemplary case):

$$B_C = \tan(\Delta\phi=2°) B_M = 0.035 * 30 \text{ mT} = 1.05 \text{ mT}$$

Now it is referred to FIG. 4 which shows the generated in-plane magnetic field in the sensor area 112 generated by the excited excitation current rail path 120 (assuming a vertical distance d of 1 mm) over the necessary current strengths for the excitation signal $I_E$ in the excitation current rail path 120. From this graph of FIG. 4 it is derivable that an excitation current with a current strength of (about) 5 A is necessary in the electric conductor 120 (excitation current rail path) in order to generate a 1.05 mT magnetic field resulting in a 2° of angle excitation in an angle sensor system 100 using a 30 mT rotating permanent magnet 116.

Using the above discussed principle, i.e. using excitation currents in an electrical conductor to produce an additional magnetic field and changing the direction of the resulting magnetic field components sensed by the sensor elements, for the inclusion in a calibration process after production, it is also possible to calculate and check the external magnetic field size of the rotating magnetic 116. This also represents the safety mechanism detecting a so called "magnet loss". If the angle change in the above discussed case is, for example, greater than 4° (twice the calibrated value $\Delta\phi$), a warning signal can indicate the overall system that the rotating magnet leaves the specified angle sensor field range of a value greater than 15 mT (half the calibrated value).

With respect to the configuration of the XMR angle sensor arrangement 100 as shown in FIGS. 3*a*-*c* showing an angle sensor 110 excited by a current rail below the sensor package 132 on a PCB 130, it should be noted that a worst-case angle error excitation (e.g. a 2° angle excitation) is achieved when the rotating magnetic field $B_M$ of the permanent magnet 116 is perpendicular to the excited magnetic field component $B_C$ generated by the excitation current rail path 120.

Figure 5A:
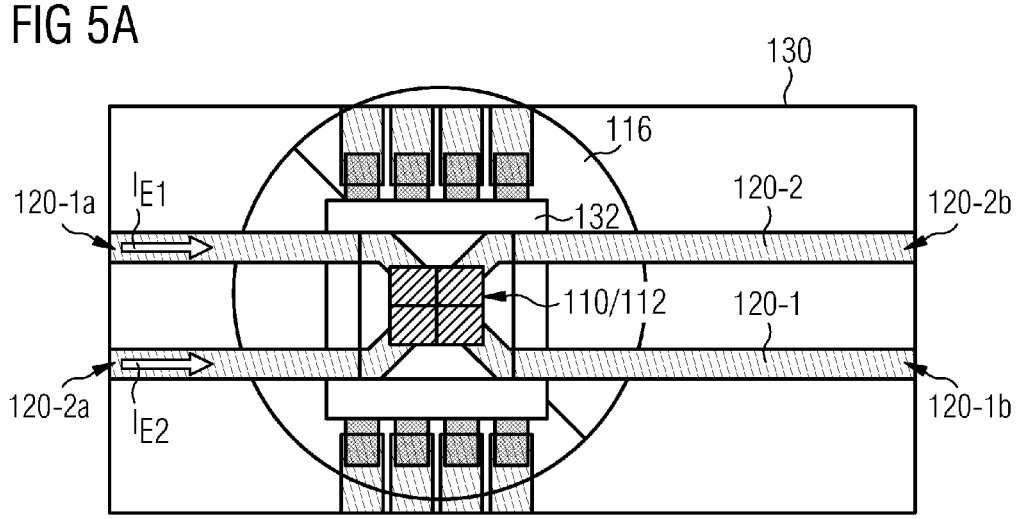
FIGS. 5A-5B show schematic plane views of the XMR angle sensor arrangement with a further excitation current rail path configuration according to an embodiment.
Figure 5B:
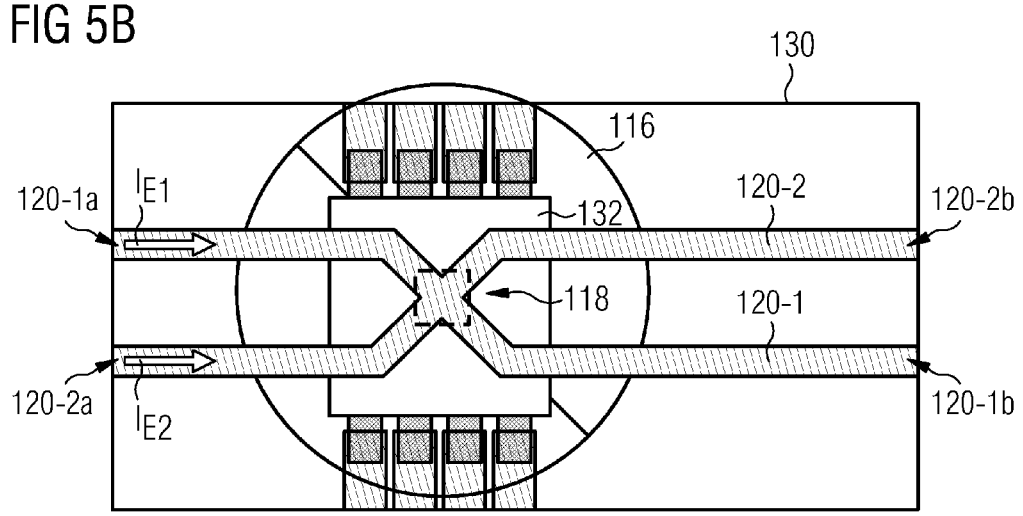

FIGS. 5*a*-*b* now show a setup for the XMR angle sensor arrangement 100 wherein the excitation current rail path 120 comprises a first and a second rail path section 120-1, 120-2, wherein the first path section 120-1 extends between a first input contact 120-1*a* and a first output contact 120-1*b*, and the second rail path section 120-2 extends between a second input contact 120-2*a* and a second output contact 120-2*b*, wherein the first and second rail path sections 120-1, 120-2 cross each other in the rail path position 100*c* in an orthogonal direction to each other. The first rail path section 120-1 and the second rail path section 120-2 the excitation current rail path 120 may extend in a common plane of the excitation current rail path 120, wherein the first and second rail path sections 120-1, 120-2 can be either electrically isolated or connected.

Thus, FIGS. 5*a*-*b* show a configuration for the excitation current rail path 120 for generating a two-dimensional excitation magnetic field wherein the first and second rail path sections 120-*a*, 120-2 cross each other in the rail path position 120*c* in an orthogonal direction to each other. This arrangement of the excitation current rail path 120 which is a portion of the chip lead frame allows to generate a changing rotational magnetic field independent of the actual position of the external permanent magnet 116.

The setup of FIGS. 5*a*-*b*, using two different current rail paths 120-1, 120-2 to excite the sensor in two different (orthogonal) directions can be realized on a PCB 130 using two different switch transistors or MOSFETs which can be configured as constant current source, one for each excitation path section 120-1, 120-2.

The first and second rail path sections 120-1, 120-2 may be implemented in a plane below the sensor package 132 inside or on top of the PCB (FIG. 5a), i.e. below the sensing area 112 with respect to the image plane of FIG. 5a.

Moreover, the first and second rail path sections 120-1, 120-2 may be implemented in a plane above the sensor package 132 and the PCB (FIG. 5b), i.e. above the sensing area 112 with respect to the image plane of FIG. 5b.

Moreover, the first and second rail path sections 120-1, 120-2 may be implemented in different planes on the PCB or in the same plane on the PCB 130.

To summarize, a current rail structure 120 below or above the angle sensor elements 110 is used to change the magnetic field direction sensed by the angle sensor element 110. This mechanism can be used to detect the correctness of the applied angle as well as the field strength of the external applied magnetic field as "magnet loss detection".

In the following, different implementations of the excitation current rail path 120 and the associated excitation current provider 122 are discussed.

Figure 6:
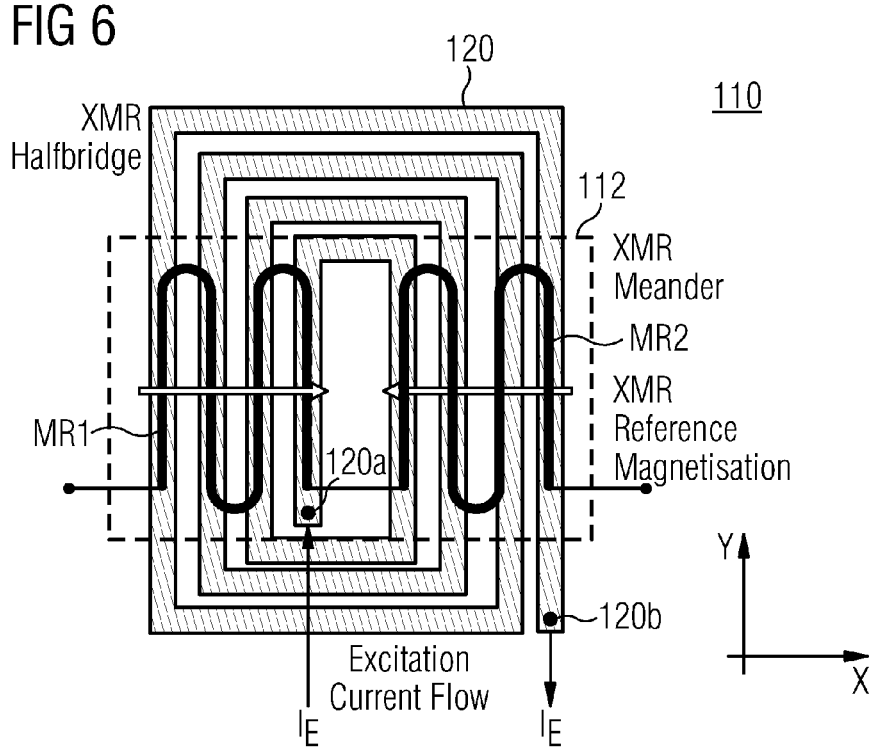
FIG. 6 shows a schematic plane view of an XMR angle sensor arrangement using the "wire on chip" principle as an excitation current rail path configuration according to an embodiment.

FIG. 6 shows an implementation of the excitation current rail path 120 and a half-bridge configuration of the sensor elements MR1, MR2 of the XMR angle sensor 110. As shown in FIG. 6, the excitation current rail path 120 comprises a conductor trace in a first (metallization) plane on a substrate 130 (e.g. a semiconductor chip), wherein the XMR sensor elements MR1, MR2 in the sensing area 112 are formed in a second (metallization) plane on the substrate 130. The XMR sensor elements MR1, MR2 and the excitation current rail path 120 are vertically stacked on the substrate 130 in an at least partially overlapping configuration.

As shown in FIG. 6, the excitation current rail path 120 is formed in the shape of a (rectangular) spiral between the input contact 120a and the output contact 120b. The XMR sensor elements in the sensing area form a half-bridge circuit with a first magnetoresistive sensor element MR1 and a second magnetoresistive sensor element MR2, the first and second magnetoresistive sensor elements MR1, MR2 have opposing reference magnetizations. The first and second magnetoresistive sensor elements MR1, MR2 have a meander structure with longitudinal meander portions, wherein the current direction in the excitation current rail path 120 is (in the overlaying regions of the meander portions and the associated rail path) concordantly (i.e. in the same direction) orthogonal to the respective reference magnetization of the first and second magnetoresistive elements MR1, MR2.

The implementation of the excitation current rail path 120 in FIG. 6 is also referred to as "wire on chip" (WOC) principle. As shown in FIG. 6, consecutive linear spiral sections are arranged orthogonally to each other.

The XMR angle sensor 110 comprises (at least one) half-bridge circuit MR1, MR2 having a first magnetoresistive sensor element MR1 with a reference direction (i.e. the direction of magnetization of the pinned layer) parallel to a first axis (x-axis), and a second magnetoresistive sensor element MR2 with a second reference direction anti-parallel (−x) to the first axis. The first and second magnetoresistive sensor elements MR1, MR2 are serially connected.

The first and second magnetoresistive sensor elements MR1, MR2 have a meander structure with parallel longitudinal meander portions, wherein linear spiral sections of the excitation current rail path 120 are in a vertically offset configuration with the associated longitudinal (at least partially overlaying) meander portions. Based on the meander layout of the first and second magnetoresistive sensor elements MR1, MR2 and the orthogonal spiral layout of the excitation current rail path 120, the current direction in the excitation current rail path 120 between the input contact 120a and the output contact 120b is equally (i.e. in the same direction) orthogonal to the respective reference magnetization of the parallel longitudinal meander portions of the first and second magnetoresistive sensor elements MR1, MR2.

The wire on chip-principle, which is still in use for XMR sensor chip production testing, e.g. for speed XMRs, can thus be used as a safety mechanism to excite the "wire on chip" (i.e. the excitation current rail path 120 arranged on a semiconductor substrate 114) during startup or operation of the XMR angle sensor arrangement 100 to detect the respective magnetic field direction and magnetic field size in the magnetoresistive sensor elements MR1, MR2. According to the "wire on chip" principle, the excitation signal $I_E$ is conducted in the excitation current rail path 120 exactly below or above the respective XMR angle sensor meanders. The wire on chip principle allows to arrange the wire (excitation current rail path 120) in very close proximity to the magnetoresistive sensor elements MR1, MR2 so that the necessary signal strength for the excitation signal $I_E$ for the excitation current pulse can be very low (or minimized when compared to further excitation approaches).

Figure 7:
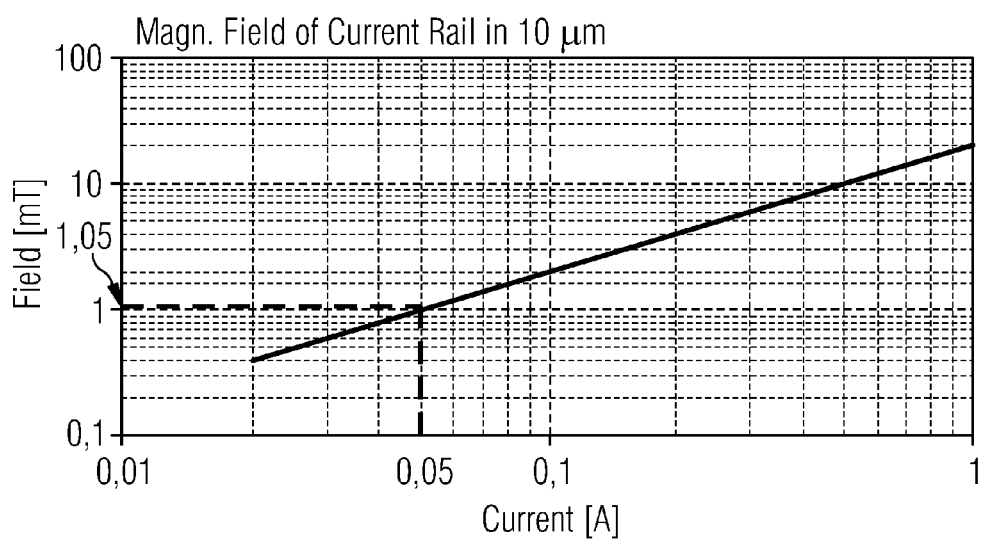
FIG. 7 shows a schematic diagram of a wire on chip generated magnetic field in an exemplary distance of 10 µm.

FIG. 7 shows in a principle diagram the graph of the resulting magnetic field versus the current strength in the excitation current rail path 120 under the assumption of a vertical distance d of 10 μm between the magnetoresistive sensor elements MR1, MR2 of the XMR angle sensor 110 and the excitation current rail path 120. Based on these indicated boundary conditions and an expected change of $\Delta\phi=2°$ (at least the exemplary worst-case angle error of the system) for achieving a magnetic field of 1.05 mT, according to the previous example, only an excitation current of 50 mA is needed to produce the expected angle change of $\Delta\phi=2°$.

FIG. 8 shows an XMR angle sensor 110 which comprises the first half-bridge circuit (e.g. of FIG. 6) having the first magnetoresistive sensor element MR1 with a first reference direction parallel to a first axis in the x-direction and a second magnetoresistive sensor element MR2 with a second reference direction anti-parallel (−x) to the first axis, and a second half-bridge circuit having a third magnetoresistive sensor element MR3 with a third reference direction parallel to a second axis in a y-direction, and a fourth magnetoresistive sensor element MR4 with a fourth reference connection anti-parallel (−y) to the second axis.

As shown in FIG. 8, the first and second half-bridges MR1, MR2 and MR3, MR4 have an essentially congruent layout except for the orientation, i.e. both half-bridges are angularly offset by 90° in the x-y-plane. Moreover, the excitation current rail path 120 extends between the input contact 120a next to the first magnetoresistive sensor element MR1 to the output contact 120b next to the fourth magnetoresistive sensor element MR4. According to FIG. 8, the excitation current rail path 120 forms two essentially identical conducting spirals (having consecutive linear spiral sections which are orthogonal to each other) but with a 90°-offset in the x-y-plane.

Thus, the third and fourth magnetoresistive sensor elements MR3, MR4 also have a meander structure with longitudinal meander portions, wherein the current direction in the excitation current rail path 120 is equally (in the same direction or concordantly) orthogonal to the respective magnetization of the third and fourth magnetoresistive sensor elements MR3, MR4.

As already indicated above, the first half-bridge circuit MR1, MR2 of FIG. 8 is (essentially) equal to the half-bridge circuit of FIG. 6. Moreover, the second half-bridge circuit MR3, MR4 of FIG. 8 and the associated excitation current rail path 120 have (essentially) the same layout as the first half-bridge circuit with an angular offset of 90° in the x-y-plane (image plane of FIG. 8). Based on the configuration of the excitation current rail path 120 and the magnetoresistive sensor elements MR1-MR4 of the XMR angle sensor 110 as shown in FIG. 8, it is possible to provide a single conductor path (wire on chip) to generate an expected and predicted angle-excitation of Δϕ, e.g. 2°, independent of the position or direction of the external rotating magnetic field $B_M$, i.e. independent on the angular position of the permanent magnet 116. This is achieved by routing the same excitation signal $I_E$ through the excitation current rail path 120 below or above the first (x) and the second (y) sensor half-bridge circuits MR1, MR2 and MR3, MR4.

FIGS. 9a-9b show a further configuration of the XMR angle sensor 110 with respect to the excitation current rail 120 in order to arrange the current excitation current rail path 120 in close proximity to the sensing area 112 of the XMR angle sensor 110. As shown in FIGS. 9a-b, the XMR angle sensor 110 is housed as a chip package device 132, wherein the chip package device 132 comprises a conductive lead frame structure, and wherein the excitation current rail path 120 is formed by a conducting portion of the lead frame structure. Based on this configuration, as shown in FIGS. 9a-b, a magnetic field can be generated near to the magnetoresistive sensor elements in the sensing area 112 of the XMR angle sensor 110 by feeding a corresponding excitation signal $I_E$ through the portion of the chip-package lead frame which is effective as excitation current rail path 120.

As also shown in FIGS. 9a-9b, the bond pads 134n of the XMR angle sensor 110 are electrically connected, for example, by means of respective bond wires 136n with the associated IC pin 138m.

As shown in FIG. 9a, the portion of the chip lead frame 120 for guiding the excitation signal $I_E$ (i.e. the excitation current pulse) has a linear or straight extension below the sensor area 112 of the XMR angle sensor 110.

As shown in FIG. 9a, the excitation current rail path 120 is arranged in a vertical distance d from the sensor area 112, wherein the excitation current rail path 120 can be arranged below or above the sensor area 112 with respect to the image plane of FIG. 9a. In use, the XMR angle sensor arrangement 100 powers on and begins to measure the angle "ϕ1" of the applied magnetic field $B_M$ of the permanent magnet 116 without passing an excitation signal $I_E$ through the excitation current rail path 120. Then, the excitation signal $I_E$ is applied to the excitation current rail path 120 resulting in a superimposing in-plane magnetic field $B_C$ which is perpendicular to the magnetic field $B_M$ of the permanent magnet 116. Then, a second angle "ϕ2", i.e. a change of direction of the resulting in-plane magnetic field component is measured which is different from the angle ϕ1 because of the addition of the second in-plane magnetic field component, with $$\Delta\phi = |\phi 1 - \phi 2|; \text{ and } B_C = \tan(\phi 1 - \phi 2)B_M = \tan(\Delta\phi)B_M.$$

Based on the above equation, the necessary signal strengths of the excitation signal can be calculated under consideration of the vertical distance d between the excitation current rail path 120 and the sensor area 112.

With respect to the configuration of the XMR angle sensor arrangement 100 as shown in FIG. 9a, it should be noted that a worst-case angle error excitation (e.g. a 2° angle excitation) is achieved when the rotating magnetic field $B_M$ of the permanent magnet 116 is perpendicular to the excited magnetic field component $B_C$ generated by the excitation current rail path 120.

As shown in FIG. 9b, the conducting portion of the chip lead frame which is effective as the excitation current rail path 120 comprises a first rail path section and a second rail path section wherein the first rail path section 120-1 extends between a first input contact 120-1a and a first output contact 120-1b, and wherein the second rail path section 120-2 extends between a second input contact 120-2a and a second output contact 120-2b, wherein the first and second rail path sections 120-1, 120-2 cross each other in the rail path position 120c in an orthogonal direction to each other.

To summarize, according to the configuration of the excitation current rail path 120 in FIGS. 9a-9b, the excitation currents run through conductive portions of the chip lead frame for generating the magnetic field components to excite the XMR angle sensor 110. Based on this configuration, the expectation current rail path 120 can be placed/arranged in very close proximity to the sensor area 112 of the magnetoresistive sensor elements with a vertical distance of about 0.3 mm (between 0.1 and 0.5 mm) so that a relatively low current strength for the excitation current is necessary for generating the excitation magnetic field components for the angle sensor excitation. Exemplary current strength is about 200 mA (60 to 400 mA).

Moreover, FIG. 9b shows a configuration for the excitation current rail path 120 for generating a two-dimensional excitation magnetic field wherein the first and second rail path sections 120-1, 120-2 cross each other in the rail path position 120c in an orthogonal direction to each other. This arrangement of the excitation current rail path 120 which is a portion of the chip lead frame allows to generate a changing rotational magnetic field independent of the actual position of the external permanent magnet 116.

In the following, FIGS. 10, 11 and 12 relate to schematic illustrations of different configurations of the circuit arrangements for generating the excitation signal $I_E$ (excitation current pulse). Thus, different configurations of the excitation signal provider 122 configured to provide the excitation current rail path 120 with an excitation signal having an excitation signal strength will be described.

FIG. 10 shows a schematic circuit configuration of the excitation signal provider 122 for generating the excitation signal $I_E$ in the excitation current rail path 120 having one wire (conducting line).

As shown in FIG. 10, a first contact (input) 120a of the excitation current rail path 120 is connected with the capacitor C1 and over a high ohmic load resistance R10 (e.g. 1.6 kΩ in PCB setup or 41 kΩ in Leadframe Setup) with a first reference potential $V_{ref1}$ (e.g. a DC supply voltage of 5V). The first contact 120a is further connected to a first contact of a charge storage capacitor C1, wherein the second contact of the charge storage capacitor C1 is connected to a second reference potential $V_{ref2}$ (e.g. ground potential). A second contact (output) 120b of the excitation current rail path 120 is connected to a first contact S1a of a switch S1, wherein a second contact S1b of the switch S1 is connected with the second reference potential $Vr_{ef2}$. A control contact S1c of the first switch is connected over a resistor R20 (e.g. 1 kΩ) to a control circuit 140. The control circuit 140 is configured to provide the switch impulse to the switch S1 in order to trigger the supply of the excitation signal $I_E$ (excitation current pulse) to the excitation current rail path 120. Thus, FIG. 10 shows the excitation current provider 122 with the connected excitation current rail path 120.

As already indicated above with respect to the embodiments, relatively high excitation currents for the excitation signal are needed (e.g. on a lead frame- or PCB-level) to generate the excitation in-plane magnetic field component in the sensing area 112 of the XMR angle sensor 110.

The necessary excitation signal having a relatively high excitation signal strength (see e.g. FIG. 4 or 7) during the pulse length of the excitation signal can be, for example, pulled out from a so called tank-capacitor (charge storage capacitor C1) which is charged in the time periods when no excitation signal $I_E$ is provided to the excitation current rail path 120 with low currents from the first reference potential $V_{ref1}$ over the resistor R10 having a high ohmic load resistance (e.g. 1.6 kΩ in PCB setup or 41 kΩ in Leadframe Setup)). If the magnetic field excitation is triggered, the capacitor C1 is discharged across the excitation current rail path 120 by opening the switch S1 to the second reference potential $V_{ref2}$ (e.g. ground potential) by means of the switch impulse from the control circuit 140.

A MOS-FET may be used for the switch S1 achieving an additional advantage in that the switch S1 acts like a "constant current source" for the time (i.e. excitation pulse period) as long as the capacitor C1 is discharged.

In the following, some equations are presented for providing exemplary dimensions of the circuit elements of the excitation current provider 122 of FIG. 10 based on the boundary conditions as exemplarily described with respect to FIG. 4 and/or FIG. 7.

If, for example, an excitation signal strength of 5 A for an excitation period of 200 μs for an exemplary PCB setup (see e.g. FIGS. 3a-c and 4) is needed, then:

$Q=5\ A*0.0002\ s=1.0\ mAs.$

Thus, the required capacitance of the capacitor C1 using a common 5 V supply voltage is:

$C=Q/U=1.0\ mAs/5V=200\ \mu F$

The required load-resistance to load this capacitor every 1 s time-interval is:

$R=(1\ s/3)/200\ \mu F=1.6\ k\Omega$

If, for example, an excitation signal strength of 200 mA for an excitation period of 200 μs for an exemplary lead frame setup (see e.g. FIGS. 9a-b) is needed, then:

$Q=0.2\ A*0.0002\ s=0.04\ mAs.$

Thus, the required capacitance of the capacitor C1 using a common 5 V supply voltage is:

$C=Q/U=0.04\ mAs/5V=8\ \mu f$

The required load-resistance to load this capacitor every 1 s time-interval is:

$R=(1\ s/3)/8\ \mu F=41\ \mu k\Omega$

The above exemplary examples of calculation are set forth to provide a more thorough explanation of the embodiments and are applicable to different boundary conditions for the XMR angle sensor arrangement 100 (with safety mechanism).

FIG. 11 shows an exemplary configuration of the excitation current provider 102 for the excitation current rail path 120, wherein the excitation current rail path 120 comprises a first and second rail path section 120-1, 120-2. The first rail path section 120-1 extends between a first input contact 120-1a and a first output contact 120-1b, and a second rail path section 120-2 extends between a second input contact 120-2a and a second output contact 120-2b, wherein the first and second rail path sections 120-1, 120-2 cross each other in the rail path position 120c in an orthogonal direction to each other.

The first and second rail path sections 120-1, 120-2 may be arranged in the same plane on a substrate.

The excitation current provider 122 of FIG. 11 has essentially the same functionality as in FIG. 10 with the additional requirement that the first and second rail path sections 120-1, 120-2 have to be triggered (activated) separately and independently.

Thus, the first input contact 120-1a of the first rail path section 120-1 is selectively connected over a switch S3 with the capacitor C1 (tank-capacitor) and with the first reference potential $V_{ref1}$ (again provided over the resistor R10 having a high-ohmic load-resistance), wherein the first output contact 120-1b of the first rail path section 120-1 is selectively connected over a switch S2 with the second reference potential $V_{ref2}$. Moreover, the first input contact 120-2a of the second rail path section 120-2 is selectively connected over a switch S4 with the capacitor C1 and with the first reference potential $V_{ref1}$ (again provided over the resistor R10 having a high-ohmic load-resistance), wherein the first output contact 120-2b of the second rail path section 120-2 is selectively connected over a switch S1 with the second reference potential $V_{ref2}$.

To be more specific, a first contact (input) S3a of the switch S3 is connected with the first contact of the capacitor C1 and with the resistor R10. The second contact (output) S3b of the switch S3 is connected to the input contact 120-1a of the first rail path section 120-1. The third contact (control) S3c of the switch S3 is connected to the control circuit 140 over the resistor R22. Further, the first contact (input) S2a of the switch S2 is connected to the output contact 120-1b of the first rail path section 120-1. The second contact (output) S2b of the switch S2 is connected with the second reference potential $V_{ref2}$. The third contact (control) S2c of the switch S2 is connected to the control circuit 140 over the resistor R21.

Moreover, a first contact (input) S4a of the switch S4 is connected with the first contact of the capacitor C1 and with the resistor R10. The second contact (output) S4b of the switch S4 is connected to the input contact 120-2a of the second rail path section 120-2. The third contact (control) S4c of the switch S4 is connected to the control circuit 140 over the resistor R23. Further, the first contact (input) S1a of the switch S1 is connected to the output contact 120-2b of the second rail path section 120-2. The second contact (output) S1b of the switch S1 is connected with the second reference potential $V_{ref2}$. The third contact (control) S2c of the switch S2 is connected to the control circuit 140 over the resistor R21.

Based on the specific circuit design as shown in FIG. 11, the control circuit 140 can selectively switch the first and second rail path sections 120-1, 120-2 in a corresponding excitation condition. To be more specific, to trigger the excitation signal $I_{E1}$ in the first rail path section 120-1, switches S3 and S2 are activated (enabled in a conducting condition) for the excitation time period, wherein the switches S4 and S1 are deactivated (disabled in a high ohmic condition). In order to trigger the excitation signal $I_{E2}$ (e.g. $I_E=I_{E1}=I_{E2}$) in the second rail path section 120-2, the switches S4 and S1 are enabled and the switches S3 and S2 are disabled during the excitation signal period.

The respective switch impulses to selectively enable the respective switches S2, S3 and S3, S4 are provided by the control circuit 140.

Figure 12A:
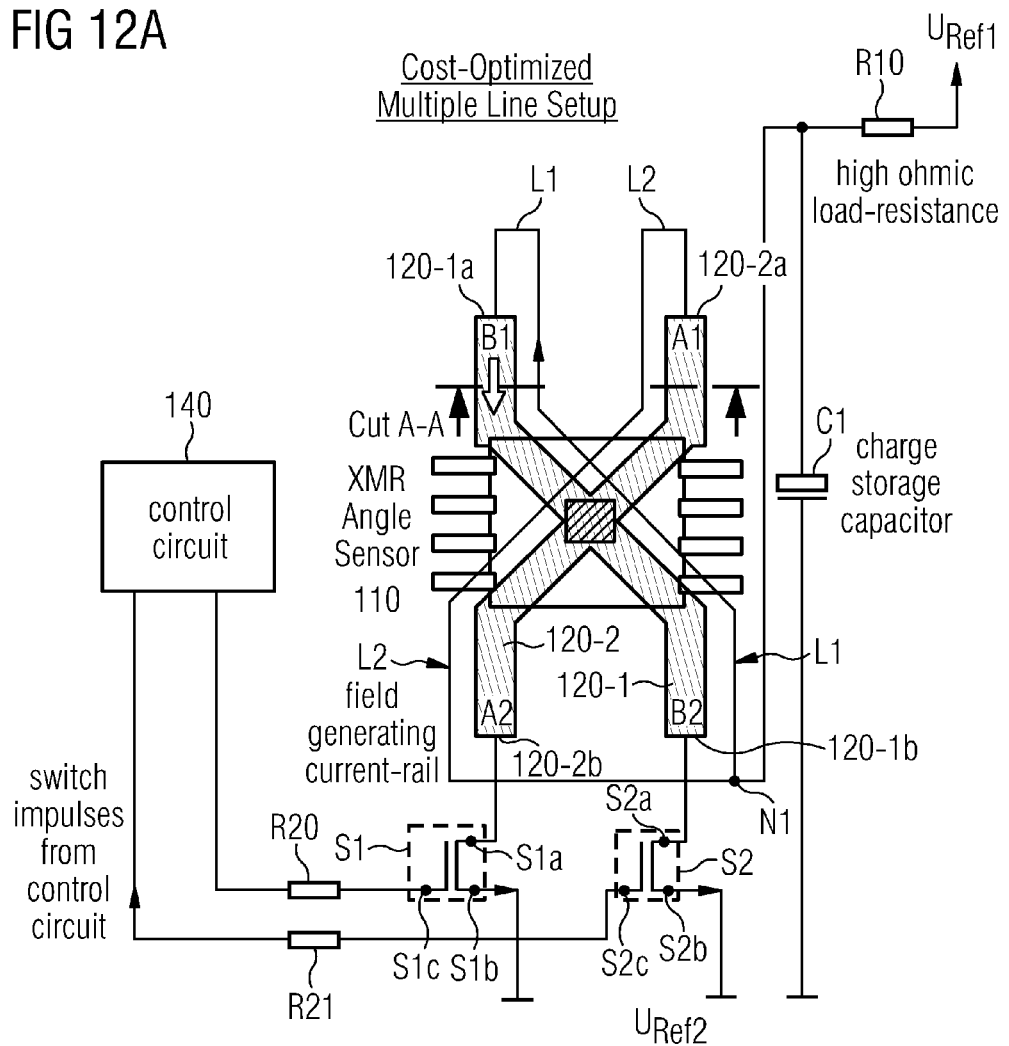
FIGS. 12A-12B show a schematic circuit diagram of an exemplary implementation of the excitation current provider and the associated excitation current rail path of the XMR angle sensor arrangement according to an embodiment.
Figure 12B:
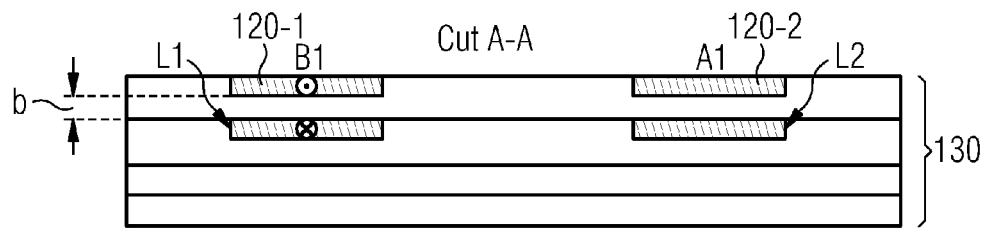

FIG. 12a-b show a further schematic circuit diagram of the excitation current provider 122 having essentially the same functionality as shown in FIG. 11, however with a reduced number of circuit elements. Thus, the circuit design of FIG. 12 may provide a cost optimized multiple line setup. As shown in FIG. 12, the excitation current rail path 120 again comprises the first and second rail path sections 120-1, 120-2. As shown in FIG. 12, specifically arranged supply lines L1, L2 extend from a common node N1 along a "specific way" to the first and second input contacts 120-1a, 120-2a, respectively, wherein the node N1 is connected to the resistor R10 and the capacitor C1.

FIG. 12b is an sectional view along the cut line a-a and indicates the magnetic coupling principle between the enabled supply line L1 and the second rail path section 120-2.

As shown in FIGS. 12a-b, the first supply line L1 is arranged essentially in parallel and vertically offset to the first rail path section 120-1 (between the node N1 and the input contact 120-1a of the first rail path section 120-1 (with an essentially constant distance b). The vertical offset arrangement may be achieved by vertically stacking the first supply line L1 and the first rail path section 120-1 in an (at least partially) overlaying configuration.

An alternative arrangement with a lateral offset may be achieved by arranging the first supply line L1 and the first rail path section 120-1 in parallel and laterally offset in the same plane of a substrate (not shown on FIGS. 12a-b).

As further shown in FIGS. 12a-b, the second supply line L2 is arranged essentially in parallel and vertically offset to the second rail path section 120-2 (between the node N1 and the input contact 120-2a of the second rail path section 120-2 (with an essentially constant distance b). The vertical offset arrangement may be achieved by vertically stacking the second supply line L2 and second first rail path section 120-2 in an (at least partially) overlaying configuration.

An alternative arrangement with a lateral offset may be achieved by arranging the second supply line L2 and the second rail path section 120-2 in parallel and laterally offset in the same plane of a substrate (not shown on FIGS. 12a-b).

The remaining circuit elements S1, S2, R20, R21, 140, C1, R10 correspond to the equally indicated circuit elements of FIG. 11.

Based on the circuit design in FIGS. 12a-b, the excitation current rail path 120 utilizes the so called magnetic line coupling principle for the current path selection. To be more specific, depending on the respective activation of the switch S1 or S2, the magnetic coupling principle forces the dynamic current flow through the selected first or second supply line L1, L2, next to the closest excitation current rail section 120-1 or 120-2 of the respectively conducting switch S1, S2, even if there is a galvanic static connection to the second rail path section.

In case, the switch S2 is enabled to provide the excitation signal $I_E$ to the first rail section 120-1, the magnetic coupling principle forces the dynamic current flow through the selected supply line L1, which is arranged next to the closest excitation current rail path section 120-1 of the respectively conducting switch S2, even if there is a galvanic static connection to the second rail path section 120-2.

The same principle is equally applicable for the activation of the excitation signal $I_E$ in the second rail path section 120-2.

A method of monitoring the functionality of an XMR angle sensor arrangement 100 shall now be described below with reference to FIG. 13.

A further embodiment provides a method 300 for monitoring the functionality of an XMR angle sensor arrangement 100. The method comprises generating 302 a first in-plane magnetic field component with a permanent magnet in the sensing area of the XMR angle sensor; generating 302 a second in-plane magnetic field component in the sensing area of the XMR angle sensor by providing an excitation current rail path with an excitation signal having an excitation signal strength, wherein the excitation signal strength of the excitation signal is chosen to generate a second in-plane magnetic field component in the sensing area of the XMR angle sensor which results, due to a super-position of the first and second in-plane magnetic field components, in an expected change of the direction of the resulting in-plane magnetic field component; sensing 306 with an XMR angle sensor an in-plane magnetic field component and for outputting a sensor signal based on the in-plane magnetic field component sensed in the sensing area; and evaluating 308 the functioning of the XMR angle sensor arrangement by determining whether the sensed change of direction of the resulting in-plane magnetic field component due to the excitation signal corresponds to the expected change of direction of the resulting in-plane magnetic field component.

The method may further comprise evaluating 310 the functioning of the XMR angle sensor arrangement by comparing the sensed change of direction of the resulting in-plane magnetic field component due to the excitation signal with the expected change of direction of the resulting in-plane magnetic field component; and providing a comparison result having an indication of the correct functioning or of a malfunction of the XMR angle sensor arrangement.

The above method is essentially applicable to the XMR angle sensor arrangement 100 as described above in FIGS. 1a to 12b.

In the present application a coupling or connection between two terminals should be understood as a direct low ohmic coupling or an indirect coupling with one or more elements between, such that a signal at a second node is dependent on a signal at a first node, which is coupled to the second node. Between two coupled terminals a further element may be coupled, but not necessarily need to be, such that two terminals which are coupled to each other may be also directly connected to each other (e.g. by means of a low impedance connection, such as a wire or a wire trace).

Furthermore, according to the present application a first terminal is directly connected to a second terminal, if a signal at the second terminal is equal to a signal at the first terminal, wherein parasitic effects or minor losses due to conductor resistances shall not be regarded. In other words, two terminals which are directly connected to each other are typically connected by means of wire traces or wires without additional elements in between.

Furthermore, according to the present application, a first terminal of a transistor may be a source terminal or an emitter terminal of the transistor or may be a drain terminal or a collector terminal of the transistor. A second terminal of the transistor may be a drain terminal or a collector terminal of the transistor or may be a source terminal or an emitter terminal of the transistor. A control terminal of the transistor may be a gate terminal or a base terminal of the transistor. Therefore, a switchable path of a transistor may be a drain source path or an emitter collector path of the transistor. A main transistor current is typically routed from the first terminal to the second terminal of the transistor or vice versa.

Furthermore two nodes or terminals are electrically coupled if a coupling path (e.g. a switchable path of a transistor) between the two coupled nodes or terminals is in a low impedance state and are electrically decoupled if the coupling path is in a high impedance state.

In the following, some exemplary definitions of possible tolerance ranges or possible deviations are given with respect to two quantities k1 and k2.

k1 is equal to k2, that means k1=k2; and
in consideration of a tolerance range (of e.g. 5%)

$$0.95k1 \leq k2 \leq 1.05k1 \text{ or } 0.95k2 \leq k1 \leq 1.05k2$$

k1 and k2 are (equal and) zero k1=k2=0; and
in consideration of a tolerance range (of e.g. 10%)

$$0.9 \leq k1/k2 \leq 1.1 \text{ or } 0.9 \leq k2/k1 \leq 1.1.$$

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

The invention claimed is:

1. XMR angle sensor arrangement comprising:
an XMR angle sensor having a sensing area for sensing an in-plane magnetic field and for outputting a sensor signal based on the in-plane magnetic field component sensed in the sensing area,
a permanent magnet, which is rotatably arranged with respect to the XMR angle sensor to generate a first in-plane magnetic field component in the sensing area of the XMR angle sensor,
an excitation current rail path, which is arranged proximate to the sensing area of the XMR angle sensor,
an excitation current provider configured to provide the excitation current rail path with an excitation signal having an excitation signal strength,
wherein the excitation signal strength of the excitation signal is chosen to generate a second in-plane magnetic field component in the sensing area of the XMR angle sensor which results, due to a super-position of the first and second in-plane magnetic field components, in an expected change of the direction of the resulting in-plane magnetic field component,
wherein the XMR angle sensor arrangement is correctly functioning when the sensed change of direction of the resulting in-plane magnetic field component due to the excitation signal corresponds to the expected change of direction of the resulting in-plane magnetic field component.

2. The sensor arrangement of claim 1, further comprising:
a processing circuit configured to evaluate the correct functioning of the XMR angle sensor arrangement based on the output signal of the XMR angle sensor.

3. The sensor arrangement of claim 2, wherein the processing circuit is configured to compare the sensed change of direction of the resulting in-plane magnetic field component due to the excitation signal with the expected change of direction of the resulting in-plane magnetic field component, and to provide a comparison result having an indication of the correct functioning or of a malfunction of the XMR angle sensor arrangement.

4. The sensor arrangement of claim 2, wherein the excitation current provider comprises a control circuit which is configured to activate the supply of the excitation current pulse to the excitation current rail path, the sensor arrangement further comprising:
a microprocessor for controlling and monitoring the operation of the XMR angle sensor, wherein the processing circuit and the control circuit are part of the microprocessor.

5. The sensor arrangement of claim 1, wherein excitation current provider comprises a control circuit which is configured to activate the supply of the excitation current pulse to the excitation current rail path.

6. The sensor arrangement of claim 1, wherein the excitation current rail path extends between an input contact and an output contact of the rail path, and wherein the excitation current rail path runs through a rail path position which is vertically offset to the sensing area of the XMR angle sensor.

7. The sensor arrangement of claim 6, wherein the excitation current rail path is electrically isolated from the sensor elements in the sensing area of the XMR angle sensor.

8. The sensor arrangement of claim 1, wherein the excitation current rail path comprises a first rail path section and a second rail path section, wherein the first rail path section extends between a first input contact and a first output contact, and the second rail path section extends between a second input contact and a second output contact, wherein the first and second rail path sections cross the rail path position in an orthogonal direction to each other.

9. The sensor arrangement of claim 8, wherein the first and the second rail path sections are electrically coupled.

10. The sensor arrangement of claim 1, wherein the excitation current rail path comprises a conductor trace on a printed circuit board (PCB), and wherein the XMR angle sensor is a chip package device mounted on the printed circuit board.

11. The sensor arrangement of claim 10, wherein the XMR angle sensor is a surface mount device (SMD).

12. The sensor arrangement of claim 1, wherein the XMR angle sensor is a chip package device with a conducting lead frame structure, wherein the excitation current rail path is formed by a conducting portion of the lead frame structure.

13. The sensor arrangement of claim 1, wherein the excitation current rail path comprises a conductor trace in a first plane on a semiconductor chip, wherein the XMR sensor elements in the sensing area are formed in a second plane on the semiconductor chip vertically offset to the first plane, wherein the XMR sensor elements and the excitation current rail path are vertically stacked on the semiconductor chip in an at least partially overlaying configuration.

14. The sensor arrangement of claim 13, wherein the XMR sensor elements in the sensing area form a half-bridge circuit with a first magnetoresistive sensor element MR1 and a second magnetoresistive sensor element MR2, the first and second magnetoresistive sensor elements MR1, MR2 have opposing reference magnetizations, wherein the first and second magnetoresistive sensor elements have a meander structure with longitudinal meander portions, wherein the current direction in the excitation current rail path is concordantly orthogonal to the respective reference magnetization of the first and second magnetoresistive elements MR1, MR2.

15. The sensor arrangement of claim 14, wherein the sensor elements of the XMR angle sensor form a further half bridge circuit with a third magnetoresistive sensor element MR3 and a fourth magnetoresistive sensor element MR4, the third and fourth magnetoresistive sensor elements MR3, MR4 have opposing reference magnetizations, wherein the third and fourth magnetoresistive sensor elements have a meander structure with longitudinal meander portions, wherein the current direction in the excitation current rail path is concordantly orthogonal to the respective reference magnetization of the third and fourth magnetoresistive elements MR3, MR4.

16. The sensor arrangement of claim 1, wherein the current provider comprises a plurality of switches to connect the input contact during an excitation current pulse with an excitation potential and the output contact with a reference potential.

17. The sensor arrangement of claim 16, wherein the switches comprise CMOS transistors.

18. The sensor arrangement of claim 16, wherein the control circuit is configured to control the switches and to activate the excitation signal provided to the excitation current rail path.

19. The sensor arrangement of claim 1, wherein the excitation current rail path utilizes the magnetic line coupling principle for the current path selection.

20. Method for monitoring the functionality of an XMR angle sensor arrangement, the method comprising:
generating a first in-plane magnetic field component with a permanent magnet in the sensing area of the XMR angle sensor,
generating a second in-plane magnetic field component in the sensing area of the XMR angle sensor by providing an excitation current rail path with an excitation signal having an excitation signal strength,
wherein the excitation signal strength of the excitation signal is chosen to generate the second in-plane magnetic field component in the sensing area of the XMR angle sensor which results, due to a super-position of the first and second in-plane magnetic field components, in an expected change of the direction of the resulting in-plane magnetic field component,
sensing with the XMR angle sensor an in-plane magnetic field component and for outputting a sensor signal based on the in-plane magnetic field component sensed in the sensing area,
evaluating the functioning of the XMR angle sensor arrangement by determining whether the sensed change of direction of the resulting in-plane magnetic field component due to the excitation signal corresponds to the expected change of direction of the resulting in-plane magnetic field component.

21. The method of claim 20, further comprising:
evaluating the functioning of the XMR angle sensor arrangement by comparing the sensed change of direction of the resulting in-plane magnetic field component due to the excitation signal with the expected change of direction of the resulting in-plane magnetic field component, and providing a comparison result having an indication of the correct functioning or of a malfunction of the XMR angle sensor arrangement.

22. A non-transitory computer readable digital storage medium having stored thereon a computer program having a program code for performing, when running on a computer or signal processor, the method of claim 20 or 21.

* * * * *